United States Patent
Lin et al.

(10) Patent No.: US 10,313,375 B2
(45) Date of Patent: Jun. 4, 2019

(54) METHOD AND APPARATUS FOR MALICIOUS ATTACK DETECTION IN AN SDN NETWORK

(71) Applicant: HUAWEI TECHNOLOGIES CO., LTD., Shenzhen, Guangdong (CN)

(72) Inventors: Ke Lin, Shenzhen (CN); Yongcan Wang, Shenzhen (CN); Yingjun Tian, Hangzhou (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 217 days.

(21) Appl. No.: 15/160,158

(22) Filed: May 20, 2016

(65) Prior Publication Data

US 2016/0269432 A1    Sep. 15, 2016

Related U.S. Application Data

(63) Continuation of application No. PCT/CN2014/085989, filed on Sep. 5, 2014.

(30) Foreign Application Priority Data

Nov. 22, 2013 (CN) .......................... 2013 1 0596661

(51) Int. Cl.
*H04L 29/00* (2006.01)
*H04L 29/06* (2006.01)
*H04L 12/26* (2006.01)

(52) U.S. Cl.
CPC .......... *H04L 63/1425* (2013.01); *H04L 43/18* (2013.01); *H04L 63/1458* (2013.01); *H04L 63/0272* (2013.01); *H04L 2463/146* (2013.01)

(58) Field of Classification Search
CPC ................. H04L 63/1425; H04L 43/18; H04L 2463/146
See application file for complete search history.

(56) References Cited

U.S. PATENT DOCUMENTS 9,692,775 B2 *   6/2017   Zhang ................... H04L 43/024
2007/0115850 A1  5/2007   Tsuchiya et al.
(Continued)

FOREIGN PATENT DOCUMENTS

CN   1812340 A    8/2006
CN   101789905 A  7/2010
(Continued)

OTHER PUBLICATIONS

OpenFlow Switch Specification Version 1.2 (Wire Protocol 0x03), ONF TS-003, Dec. 5, 2011. total 85 pages.
(Continued)

*Primary Examiner* — Brandon S Hoffman
*Assistant Examiner* — Helai Salehi
(74) *Attorney, Agent, or Firm* — Yeh Kurt Chang (57) ABSTRACT

A malicious attack detection method includes: receiving, by a controller, a Packet-in message sent by a switch, where the Packet-in message includes a source host identifier and a destination host identifier of a data packet for which the switch does not find a flow entry; when determining that a host indicated by the destination host identifier does not exist in an SDN network, sending, by the controller, an abnormal flow entry to the switch; receiving, by the controller, a triggering count sent by the switch, where the triggering count is a quantity of times that the abnormal flow entry is triggered; and determining, according to the triggering count, whether a malicious attack is initiated. According to the method, a malicious attack from a host can be detected, a data processing volume of a controller can be reduced, and performance of the controller can be improved.

11 Claims, 7 Drawing Sheets

(56) References Cited

U.S. PATENT DOCUMENTS

| | | |
|---|---|---|
| 2008/0028467 A1 | 1/2008 | Kommareddy et al. |
| 2008/0189769 A1* | 8/2008 | Casado .............. G06F 21/6281 726/4 |
| 2011/0055921 A1 | 3/2011 | Narayanaswamy et al. |
| 2012/0020220 A1 | 1/2012 | Sugita |
| 2012/0151583 A1 | 6/2012 | Kang et al. |
| 2013/0074183 A1 | 3/2013 | Yoon |
| 2013/0081131 A1 | 3/2013 | Yokota |
| 2013/0188489 A1 | 7/2013 | Sato |
| 2013/0254891 A1 | 9/2013 | Onoda |
| 2013/0283374 A1 | 10/2013 | Zisapel et al. |
| 2014/0033275 A1 | 1/2014 | Kawamoto |
| 2014/0331280 A1* | 11/2014 | Porras .................... H04L 63/20 726/1 |
| 2015/0052576 A1 | 2/2015 | Togawa |
| 2016/0234848 A1 | 8/2016 | Yamagata et al. |

FOREIGN PATENT DOCUMENTS

| | | |
|---|---|---|
| CN | 102195887 A | 9/2011 |
| CN | 103250392 A | 8/2013 |
| EP | 2293513 A1 | 3/2011 |
| JP | 2013201478 A | 10/2013 |
| WO | 2012056816 A1 | 5/2012 |
| WO | 2012077259 A1 | 6/2012 |
| WO | 2012077603 A1 | 6/2012 |
| WO | 2012141086 A1 | 10/2012 |
| WO | 2013093857 A1 | 6/2013 |
| WO | 2013150925 A1 | 10/2013 |
| WO | 2013164988 A1 | 11/2013 |

OTHER PUBLICATIONS

OpenFlow Switch Specification, Version 1.3.0 (Wire Protocol 0x04), ONF TS-006, Jun. 25, 2012. total 106 pages.

* cited by examiner

METHOD AND APPARATUS FOR MALICIOUS ATTACK DETECTION IN AN SDN NETWORK

CROSS-REFERENCE TO RELATED APPLICATIONS

This application is a continuation of International Application No. PCT/CN2014/085989, filed on Sep. 5, 2014, which claims priority to Chinese Patent Application No. 201310596661.0, filed on Nov. 22, 2013, both of which are hereby incorporated by reference in their entireties.

TECHNICAL FIELD

The present disclosure relates to the field of communications, and in particular, to a malicious attack detection method and apparatus.

BACKGROUND

The basic idea of a software defined networking (SDN) network is to implement separation between a control plane and a forwarding plane. The SDN network generally includes a controller, a switch, and a host. The controller is configured to formulate, based on a view of the entire network, a routing policy, and deliver the routing policy to the switch in a form of a flow entry, so that the switch saves the flow entry to a flow table, and thereby the controller implements centralized control on the entire network by controlling the flow table in the switch; the switch is configured to forward a data packet of the host according to a local flow entry of the switch.

Figure 1:
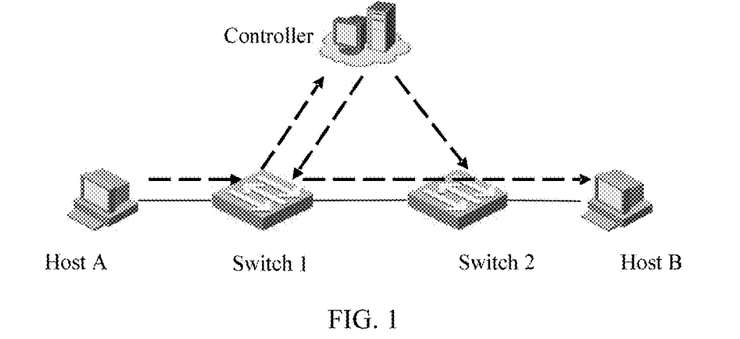
FIG. 1 is a schematic diagram of a host communication scenario 1 in an SDN network in the prior art.

In an SDN network, a general communication scenario of a host is shown in FIG. 1, where a host A sends a data packet to a switch 1 connected to the host A, and it is assumed that a destination host of the data packet is a host B in the SDN network; the switch 1 searches a local flow table for a flow entry of the data packet, and if the switch 1 finds the flow entry of the data packet, the switch 1 forwards the data packet according to the flow entry, or if the switch 1 does not find the flow entry of the data packet, the switch 1 sends a Packet-in message to a controller; the controller selects a forwarding path for the data packet, and delivers the forwarding path to all switches on the forwarding path in a form of a flow entry; and the switch 1 and the switches on the forwarding path forward the data packet according to the delivered flow entry.

Because the controller has delivered the flow entry for communication between the host A and the host B to all switches on the forwarding path, when the host A subsequently sends a data packet whose destination host is the host B, the switch 1 may directly forward the data packet according to the flow entry, and the switch 1 does not generate a Packet-in message again.

Figure 2:
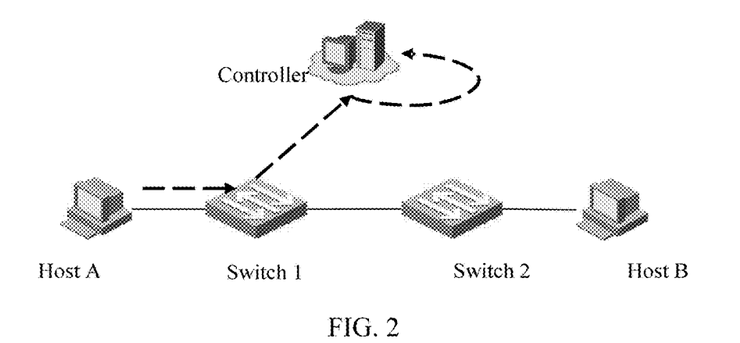
FIG. 2 is a schematic diagram of a host communication scenario 2 in an SDN network in the prior art.

If a destination host of a data packet sent by a host is a host C outside an SDN network, a communication scenario is shown in FIG. 2, where a host A sends a data packet to a switch 1 connected to the host A, and it is assumed that a destination host of the data packet is the host C, and the SDN network does not include the host C;

the switch 1 searches a local flow table of the switch for a flow entry of the data packet, and because the host C is not in the SDN network, the switch 1 cannot find the flow entry of the data packet, and sends a Packet-in message to a controller; and the controller receives the Packet-in message, and searches the SDN network for the host C; because the host C is not in the SDN network, the controller cannot find the host C, and then the controller discards the Packet-in message, and does not deliver a flow entry for the data packet to the switch 1.

If the host A subsequently sends again a data packet whose destination host is the host C, both the switch 1 and the controller repeat the foregoing steps, and finally the controller discards the Packet-in message.

Based on the foregoing communication method of a host in an SDN network, it may be considered that the Packet-in message in the scenario shown in FIG. 1 is a normal Packet-in message, while the Packet-in message in the scenario shown in FIG. 2 is an invalid Packet-in message. If a host in the SDN network performs a malicious attack on a controller, and sends a large quantity of data packets whose destination host is not in the SDN network or whose destination host even does not exist, a switch connected to the host generates a large quantity of invalid Packet-in messages and sends the invalid Packet-in messages to the controller, and the controller needs to consume a large quantity of processing resources to process these invalid Packet-in messages, to search for the destination host that is not in the SDN network or that even does not exist, thereby affecting processing of a normal Packet-in message by the controller.

Therefore, detection of a malicious attack on a controller from a host needs to be performed in an SDN network. Currently, a method for detecting a malicious attack from a host is that: a controller collects statistics about a quantity of Packet-in messages, correspondingly generated by each host as a source host, received in a unit time; calculates, by using the quantity, a rate at which each host generates Packet-in messages as a source host; and determines, according to the rate, whether each host performs a malicious attack on the controller.

In such a method for detecting a malicious attack from a host, a controller needs to receive a Packet-in message reported by each switch and process the Packet-in message; in addition, the controller further needs to separately collect statistics about a quantity of Packet-in messages, correspondingly generated by each host as a source host, received in a unit time, and then determine whether each host performs a malicious attack on the controller. An amount of data processed by the controller is large, and performance of the controller is low.

SUMMARY

Embodiments of the present disclosure provide a malicious attack detection method and apparatus, so that a malicious attack from a host can be detected, a data processing volume of a controller can be reduced, and performance of the controller can be improved.

According to a first aspect, a malicious attack detection method is provided, including:

receiving, by a controller, a Packet-in message sent by a first switch, where the Packet-in message includes a source host identifier and a destination host identifier of a data packet for which the first switch does not find a flow entry;

when determining that a host indicated by the destination host identifier does not exist in an SDN network, sending, by the controller, an abnormal flow entry to the first switch, where the abnormal flow entry includes the source host identifier;

receiving, by the controller, a triggering count sent by the first switch, where the triggering count is sent by the first switch after the abnormal flow entry times out, and the triggering count is a quantity of times that the abnormal flow entry is triggered; and determining, by the controller according to the triggering count, whether a malicious attack is initiated from a source host indicated by the source host identifier.

With reference to the first aspect, in a first possible implementation manner of the first aspect, the determining, by the controller according to the triggering count, whether a malicious attack is initiated from a source host indicated by the source host identifier includes:

calculating, by the controller, a triggering rate of the abnormal flow entry according to the triggering count and an aging time of the abnormal flow entry; and determining, by the controller, whether the triggering rate is greater than a rate threshold; and if the triggering rate is greater than the rate threshold, determining, by the controller, that a malicious attack is initiated from the source host; or, if the triggering rate is not greater than the rate threshold, determining, by the controller, that no malicious attack is initiated from the source host.

With reference to the first aspect, in a second possible implementation manner of the first aspect, the determining, by the controller according to the triggering count, whether a malicious attack is initiated from a source host indicated by the source host identifier includes:

determining, by the controller, whether the triggering count is greater than a count threshold; and if the triggering count is greater than the count threshold, determining, by the controller, that a malicious attack is initiated from the source host; or, if the triggering count is not greater than the count threshold, determining, by the controller, that no malicious attack is initiated from the source host.

With reference to the first aspect, and/or the first possible implementation manner of the first aspect, and/or the second possible implementation manner of the first aspect, in a third possible implementation manner of the first aspect, before the sending, by the controller, an abnormal flow entry to the first switch, the method further includes:

determining, by the controller, whether an abnormal flow entry of the source host indicated by the source host identifier has been delivered to the first switch; and if the abnormal flow entry of the source host indicated by the source host identifier has not been delivered to the first switch, performing, by the controller, the step of sending an abnormal flow entry to the first switch.

With reference to the first aspect, and/or the first possible implementation manner of the first aspect, and/or the second possible implementation manner of the first aspect, and/or the third possible implementation manner of the first aspect, in a fourth possible implementation manner of the first aspect, the method further includes:

when determining that a last flow table in the first switch is a precise matching table including a source host identifier matching domain, sending, by the controller, a first instruction to the first switch, where the first instruction is used to instruct the first switch to configure the precise matching table as a precise matching table matching only the source host identifier matching domain, so that the first switch stores the abnormal flow entry in the last flow table.

With reference to the first aspect, and/or the first possible implementation manner of the first aspect, and/or the second possible implementation manner of the first aspect, and/or the third possible implementation manner of the first aspect, in a fifth possible implementation manner of the first aspect, the method further includes:

when determining that a last flow table in the first switch is a precise matching table, and a wildcarded table including a source host identifier matching domain exists in the first switch, sending, by the controller, a second instruction to the first switch, where the second instruction is used to instruct the first switch to adjust the wildcarded table including a source host identifier matching domain to be the last flow table, so that the first switch stores the abnormal flow entry in the last flow table.

With reference to the first aspect, and/or the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, in a sixth possible implementation manner of the first aspect, a priority of the abnormal flow entry is a lowest priority of a flow entry in the first switch.

With reference to the first aspect, and/or the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, and/or the sixth possible implementation manner of the first aspect, in a seventh possible implementation manner of the first aspect, the method further includes:

when determining, according to the triggering count, that a malicious attack is initiated from the source host indicated by the source host identifier, sending, by the controller, a third instruction to the first switch, where the third instruction is used to instruct the first switch to suppress a data packet from the source host.

According to a second aspect, a malicious attack detection method is provided, including:

when determining that a flow entry corresponding to a data packet is not found, sending, by a first switch, a Packet-in message to a controller, where the Packet-in message includes a source host identifier and a destination host identifier of the data packet;

receiving and saving, by the first switch, an abnormal flow entry, where the abnormal flow entry is sent by the controller when determining that a host indicated by the destination host identifier does not exist in an SDN network; and recording, by the first switch within an aging time of the abnormal flow entry, a triggering count of the abnormal flow entry, and sending the triggering count to the controller after the abnormal flow entry times out, so that the controller determines, according to the triggering count, whether a malicious attack is initiated from a source host indicated by the source host identifier.

With reference to the second aspect, in a first possible implementation manner of the second aspect, the method further includes:

receiving, by the first switch, a first instruction sent by the controller, and configuring, according to the first instruction, a local precise matching table which is a last flow table as a precise matching table matching only a source host identifier matching domain; or, receiving, by the first switch, a second instruction sent by the controller, and adjusting a wildcarded table including a source host identifier matching domain to be a last flow table according to the second instruction.

With reference to the first possible implementation manner of the second aspect, in a second possible implementation manner of the second aspect, the saving, by the first switch, an abnormal flow entry includes:

saving, by the first switch, the abnormal flow entry to the last flow table.

With reference to the second aspect, and/or the first possible implementation manner of the second aspect, and/or the second possible implementation manner of the second aspect, in a third possible implementation manner of the second aspect, the method further includes:

receiving, by the first switch, a third instruction sent by the controller, where the third instruction is sent by the controller when determining, according to the triggering count, that a malicious attack is initiated from the source host indicated by the source host identifier; and suppressing, by the first switch according to the third instruction, a data packet from the source host.

According to a third aspect, a malicious attack detection apparatus is provided, including:

a first receiving unit, configured to receive a Packet-in message sent by a first switch, where the Packet-in message includes a source host identifier and a destination host identifier of a data packet for which the first switch does not find a flow entry;

a first sending unit, configured to: when it is determined that a host indicated by the destination host identifier received by the first receiving unit does not exist in an SDN network, send an abnormal flow entry to the first switch, where the abnormal flow entry includes the source host identifier, where the first receiving unit is further configured to receive a triggering count sent by the first switch, where the triggering count is sent by the first switch after the abnormal flow entry times out, and the triggering count is a quantity of times that the abnormal flow entry is triggered; and a detection unit, configured to determine, according to the triggering count received by the first receiving unit, whether a malicious attack is initiated from a source host indicated by the source host identifier.

With reference to the third aspect, in a first possible implementation manner of the third aspect, the detection unit is configured to:

calculate a triggering rate of the abnormal flow entry according to the triggering count received by the first receiving unit and an aging time of the abnormal flow entry; and determine whether the triggering rate is greater than a rate threshold; and if the triggering rate is greater than the rate threshold, determine that a malicious attack is initiated from the source host; or, if the triggering rate is not greater than the rate threshold, determine that no malicious attack is initiated from the source host.

With reference to the third aspect, in a second possible implementation manner of the third aspect, the detection unit is configured to:

determine whether the triggering count is greater than a count threshold; and if the triggering count is greater than the count threshold, determine, that a malicious attack is initiated from the source host; or, if the triggering count is not greater than the count threshold, determine, that no malicious attack is initiated from the source host.

With reference to the third aspect, and/or the first possible implementation manner of the third aspect, and/or the second possible implementation manner of the third aspect, in a third possible implementation manner of the third aspect, the method further includes:

a determining unit, configured to determine whether an abnormal flow entry of the source host indicated by the source host identifier has been delivered to the first switch; and if the abnormal flow entry of the source host indicated by the source host identifier has not been delivered to the first switch, trigger the first sending unit to send an abnormal flow entry to the first switch.

With reference to the third aspect, and/or the first possible implementation manner of the third aspect, and/or the second possible implementation manner of the third aspect, and/or the third possible implementation manner of the third aspect, in a fourth possible implementation manner of the third aspect, the first sending unit is further configured to: when it is determined that a last flow table in the first switch is a precise matching table including a source host identifier matching domain, instruct the first switch to configure the precise matching table as a precise matching table matching only the source host identifier matching domain, so that the first switch stores the abnormal flow entry in the last flow table.

With reference to the third aspect, and/or the first possible implementation manner of the third aspect, and/or the second possible implementation manner of the third aspect, and/or the third possible implementation manner of the third aspect, in a fifth possible implementation manner of the third aspect, the first sending unit is further configured to:

when it is determined that a last flow table in the first switch is a precise matching table, and a wildcarded table including a source host identifier matching domain exists in the first switch, send a second instruction to the first switch, where the second instruction is used to instruct the first switch to adjust the wildcarded table including a source host identifier matching domain to be the last flow table, so that the first switch stores the abnormal flow entry in the last flow table.

With reference to the third aspect, and/or the first possible implementation manner of the third aspect, and/or the second possible implementation manner of the third aspect, and/or the third possible implementation manner of the third aspect, and/or the fourth possible implementation manner of the third aspect, and/or the fifth possible implementation manner of the third aspect, in a sixth possible implementation manner of the third aspect, the first sending unit is further configured to:

when it is determined, according to the triggering count, that a malicious attack is initiated from the source host indicated by the source host identifier, send a third instruction to the first switch, where the third instruction is used to instruct the first switch to suppress a data packet from the source host.

According to a fourth aspect, a malicious attack detection apparatus is provided, including:

a second sending unit, configured to: when it is determined that a flow entry corresponding to a data packet is not found, send a Packet-in message to a controller, where the Packet-in message includes a source host identifier and a destination host identifier of the data packet;

a second receiving unit, configured to receive an abnormal flow entry, where the abnormal flow entry is sent by the controller when determining that a host indicated by the destination host identifier does not exist in an SDN network;

a storing unit, configured to save the abnormal flow entry received by the second receiving unit; and a count recording unit, configured to record, within an aging time of the abnormal flow entry saved by the storing unit, a triggering count of the abnormal flow entry, where the second sending unit is further configured to: after the abnormal flow entry saved by the storing unit times out, send the triggering count recorded by the count recording unit to the controller, so that the controller determines, according to the triggering count, whether a malicious attack is initiated from a source host indicated by the source host identifier.

With reference to the fourth aspect, in a first possible implementation manner of the second aspect, the second receiving unit is further configured to receive a first instruction sent by the controller; and the apparatus further includes: a configuration unit, configured to configure, according to the first instruction, a local precise matching table which is a last flow table as a precise matching table matching only a source host identifier matching domain; or the second receiving unit is further configured to receive a second instruction sent by the controller; and the apparatus further includes: a configuration unit, configured to adjust a wildcarded table including a source host identifier matching domain to be a last flow table according to the second instruction.

With reference to the first possible implementation manner of the second aspect, in a second possible implementation manner of the second aspect, the storing unit is configured to save the abnormal flow entry to the last flow table.

With reference to the second aspect, and/or the first possible implementation manner of the second aspect, and/or the second possible implementation manner of the second aspect, in a third possible implementation manner of the second aspect, the second receiving unit is further configured to receive a third instruction sent by the first switch; and the apparatus further includes: a control unit, configured to suppress a data packet from the source host.

In the embodiments, a controller receives a Packet-in message sent by a first switch, where the Packet-in message includes a source host identifier and a destination host identifier of a data packet for which the first switch does not find a flow entry; when determining that a host indicated by the destination host identifier does not exist in an SDN network, the controller sends an abnormal flow entry to the first switch, where the abnormal flow entry includes the source host identifier; the controller receives a triggering count, of the abnormal flow entry, sent by the first switch after the abnormal flow entry times out; and the controller determines, according to the triggering count, whether a malicious attack is initiated from a source host indicated by the source host identifier. In the embodiments, the controller does not need to collect statistics about Packet-in messages corresponding to each host, instead, the first switch collect statistic by using the triggering count of the abnormal flow entry. In this way, message statistics collection originally performed by the controller is distributed to each switch for execution, thereby reducing a data processing volume of the controller, and improving performance of the controller.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

First, a flow table in a switch and a flow table structure are described.

Generally, a switch includes a minimum of one flow table and a maximum of 255 flow tables. The switch includes a Pipeline, flow tables of the switch are arranged in the Pipeline in sequence. The switch does not necessarily use all flow tables in the switch, but may use only some of the flow tables. For example, the switch in FIG. 2A may include ten flow tables, but the switch actually uses only the first seven flow tables table0 to table6 in the Pipeline, the latter three flow tables table7 to table9 are not shown in the figure and are not used by the switch. A flow entry is stored in a flow table and is used to record a forwarding path between two hosts.

Figure 2A:
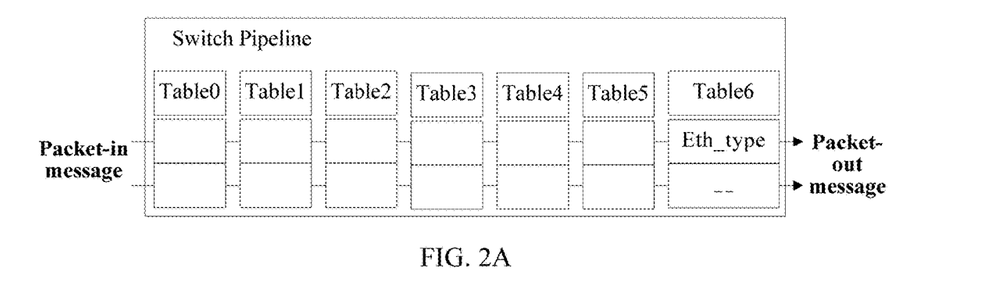
FIG. 2A is a schematic structural diagram of a flow table in a switch in the prior art.

As shown in FIG. 2A, when receiving a data packet, the switch searches, according to the data packet, flow tables of a Pipeline in sequence for a flow entry that can match the data packet, until a flow entry that can match the data packet is found, or until a last flow table is searched while no flow entry that can match the data packet is found.

A flow table is a core of a forwarding policy of a switch, and is similar to a routing table of a conventional router, and occupies a most part of storage resources of the switch. Flow tables may be classified into two types: a wildcarded table and a precise matching table:

In a precise matching table, specific values must be given to all matching domains of a flow entry. When a data packet is matched with a flow entry in a precise matching table, it is considered that the data packet and the flow entry match only when values of all matching domains of the data packet and those of the flow entry are correspondingly equal. For example, as shown in Table 1, the precise matching table includes five matching domains: a source Internet protocol (Src IP), a destination Internet protocol (Dst IP), a source port (SrcPort), a destination port (DstPort), and an IP protocol (IP Protocol), and three instructions (Instructions): write actions (Write Actions), write metadata (Write Metadata), and go to table (GoToTable). Each matching domain in the flow entry shown in Table 1 has a specific value. When a data packet is matched with the flow entry, it can be considered that the data packet matches the flow entry only when values of the five matching domains: Src IP, Dst IP, SrcPort, DstPort, and IP Protocol of the data packet and those of the flow entry are correspondingly equal.

TABLE 1

| Matching domains | | | | | Instructions | | |
|---|---|---|---|---|---|---|---|
| Src IP | Dst IP | SrcPort | DstPort | IP Protocol | Write Actions | Write Metadata | GoToTable |
| 192.168.1.1 | 192.168.20.1 | 1000 | 3000 | TCP | | | Table5 |

In a wildcarded table, values may be given to only a part of matching domains of a flow entry. When a data packet is matched with a flow entry in the wildcarded table, it is considered that the data packet and the flow entry match provided that values of the part of matching domains of the data packet and those of the flow entry are correspondingly equal. For example, as shown in Table 2, the wildcarded table includes five matching domains: Src IP, Dst IP, SrcPort, DstPort, and IP Protocol, and three Instructions: Actions, Write Metadata, and GoToTable; only the matching domain Dst IP in the flow entry shown in Table 2 has a specific value 192.168.20.1. When a data packet is matched with a flow entry in the matching table, it is considered that the data packet and the flow entry shown in Table 2 match provided that a value of the matching domain Dst IP in the data packet is also 192.168.20.1.

TABLE 2

| Matching domains | | | | | Instructions | | |
|---|---|---|---|---|---|---|---|
| Src IP | Dst IP | SrcPort | DstPort | IP Protocol | Write Actions | Write Metadata | GoToTable |
| Any (Any) | 192.168.20.1 | Any | Any | Any | | | Table5 |

The following clearly describes the technical solutions in the embodiments of the present disclosure with reference to the accompanying drawings in the embodiments of the present disclosure. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 3:
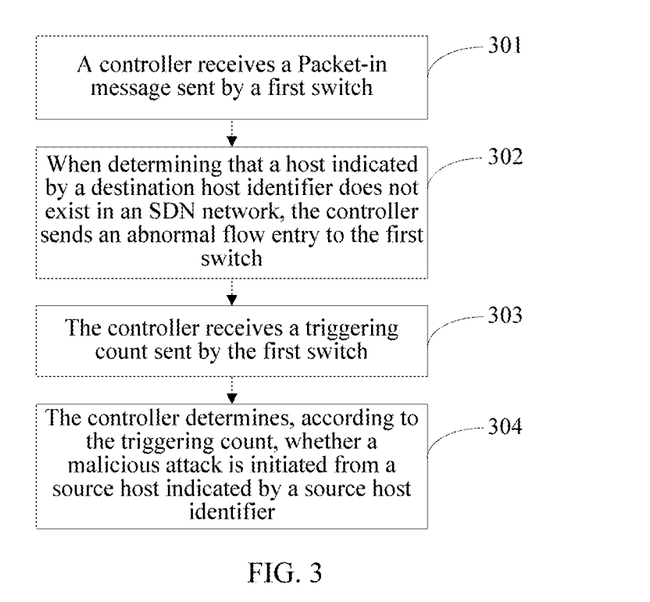
FIG. 3 is a schematic flowchart of a first embodiment of a malicious attack detection method according to the present disclosure.

Referring to FIG. 3, FIG. 3 is a schematic diagram of a first embodiment of a malicious attack detection method according to the present disclosure, where the method includes:

Step 301: A controller receives a Packet-in message sent by a first switch, where the Packet-in message includes a source host identifier and a destination host identifier of a data packet for which the first switch does not find a flow entry.

Step 302: When determining that a host indicated by the destination host identifier does not exist in an SDN network, the controller sends an abnormal flow entry to the first switch, where the abnormal flow entry includes the source host identifier.

Step 303: The controller receives a triggering count sent by the first switch, where the triggering count is sent by the first switch after the abnormal flow entry times out, and the triggering count is a quantity of times that the abnormal flow entry is triggered.

Step 304: The controller determines, according to the triggering count, whether a malicious attack is initiated from a source host indicated by the source host identifier.

In this embodiment, a controller does not need to collect statistics about Packet-in messages corresponding to each host, and sends an abnormal flow entry to a first switch instead; the first switch collects statistics about a triggering count of the abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

Figure 4:
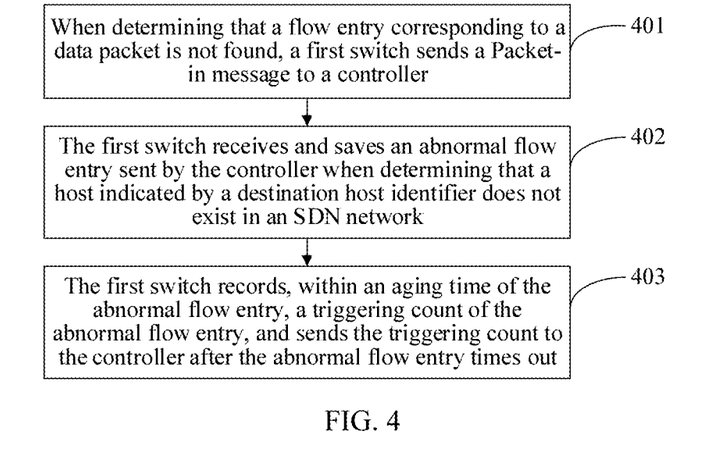
FIG. 4 is a schematic flowchart of a second embodiment of a malicious attack detection method according to the present disclosure.

Referring to FIG. 4, FIG. 4 is a schematic diagram of a second embodiment of a malicious attack detection method according to the present disclosure, where the method includes:

Step 401: When determining that a flow entry corresponding to a data packet is not found, a first switch sends a Packet-in message to a controller, where the Packet-in message includes a source host identifier and a destination host identifier of the data packet.

Step 402: The first switch receives and saves an abnormal flow entry sent by the controller, where the abnormal flow entry is sent by the controller when determining that a host indicated by the destination host identifier does not exist in an SDN network.

Step 403: The first switch records, within an aging time of the abnormal flow entry, a triggering count of the abnormal flow entry, and sends the triggering count to the controller after the abnormal flow entry times out, so that the controller determines, according to the triggering count, whether a malicious attack is initiated from a source host indicated by the source host identifier.

In this embodiment, a controller does not need to collect statistics about Packet-in messages corresponding to each host, and instead, a first switch collects statistics about a triggering count of an abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

Figure 5:
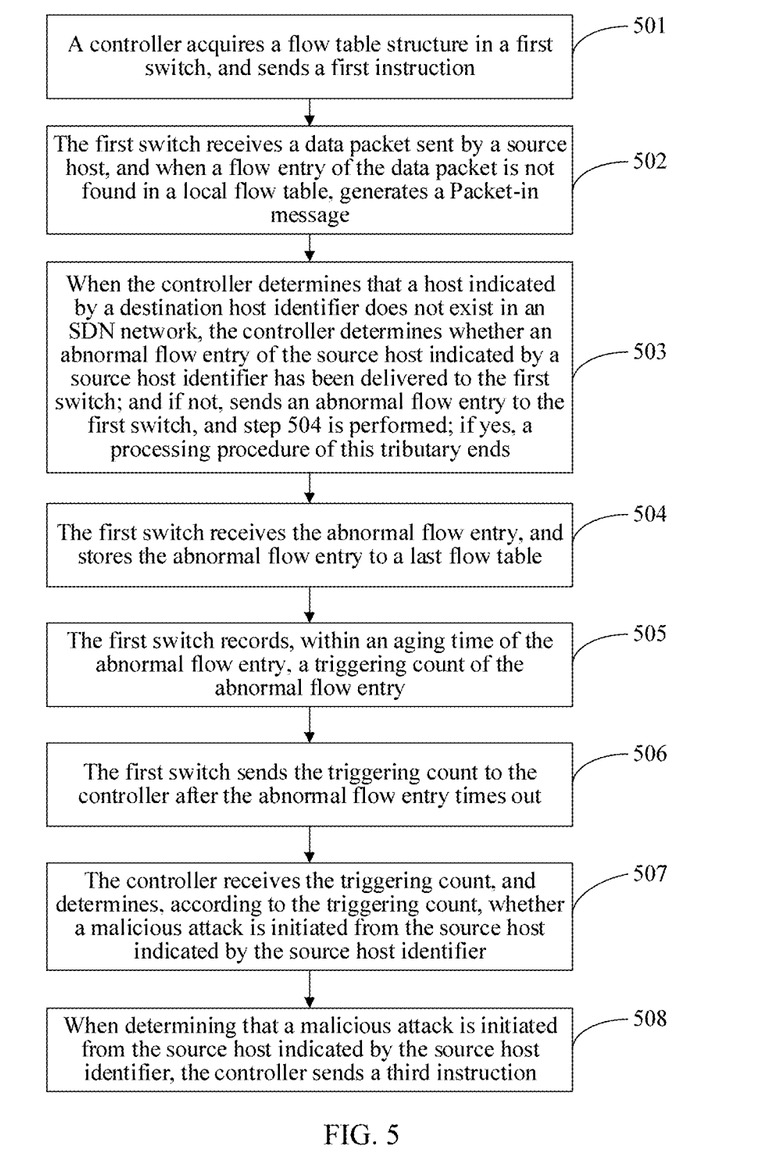
FIG. 5 is a schematic flowchart of a third embodiment of a malicious attack detection method according to the present disclosure.

Referring to FIG. 5, FIG. 5 is a schematic diagram of a third embodiment of a malicious attack detection method according to the present disclosure, where the method includes:

Step 501: A controller acquires a flow table structure in a first switch, and when determining that a last flow table in the first switch is a precise matching table including a source host identifier matching domain, sends a first instruction to the first switch, where the first instruction is used to instruct the first switch to configure the precise matching table as a precise matching table matching only the source host identifier matching domain.

It is stipulated in the OpenFlow1.3 protocol that a controller may configure a matching domain type of each flow table in a switch by using a Multipart message of a TABLE_FEATURES type. Therefore, in this step, the controller may also configure, by using this manner, a precise matching table including a source host identifier matching domain as a precise matching table matching only a source host identifier matching domain.

Figure 5A:
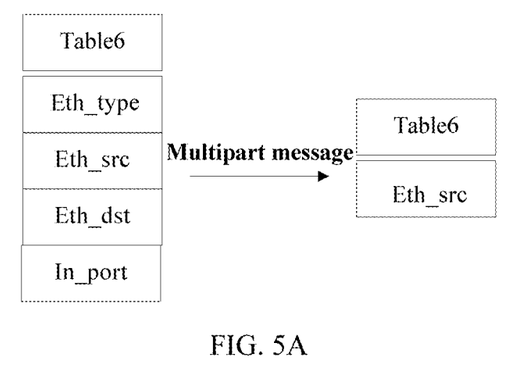
FIG. 5A is a diagram of comparison before and after a precise matching table is configured according to the present disclosure.

For example, referring to FIG. 5A, assuming that the source host identifier is a source host MAC address, that the source host identifier matching domain is implemented by using an ETH_SRC matching domain, and that the last flow table of the first switch is a precise matching table having four matching domains: Eth_type, Eth_src, Eth_dst and In_port, the controller may instruct, by delivering a Multipart message of a table feature (TABLE_FEATURES) type, the first switch to configure the precise matching table as a precise matching table only matching the Eth_src matching domain.

The objective of this step is to ensure that the last flow table in the first switch is a wildcarded table including a source host identifier matching domain, or, a precise matching table matching only a source host identifier matching domain. Therefore, step 501 may further be replaced with the following step:

A controller acquires a flow table structure in a first switch; and when determining that a last flow table in the first switch is a precise matching table or a wildcarded table not including a source host identifier matching domain and that a wildcarded table including a source host identifier matching domain exists in the first switch, sends a second instruction to the first switch, where the second instruction is used to instruct the first switch to adjust the wildcarded table including a source host identifier matching domain to be the last flow table.

Figure 5B:
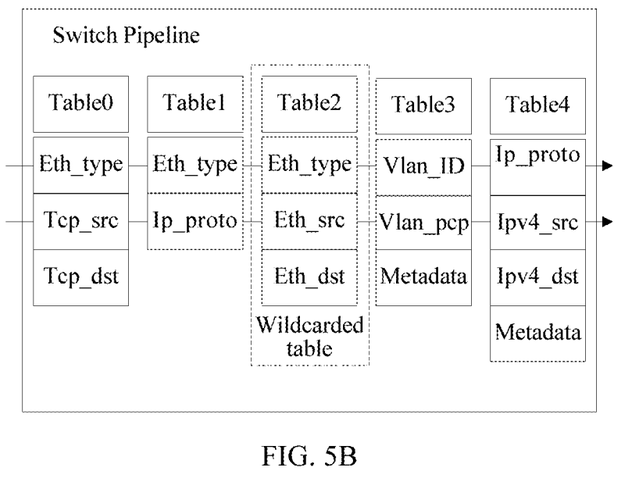
FIG. 5B is a structural diagram before positions of a precise matching table and a wildcarded table are interchanged according to the present disclosure.
Figure 5C:
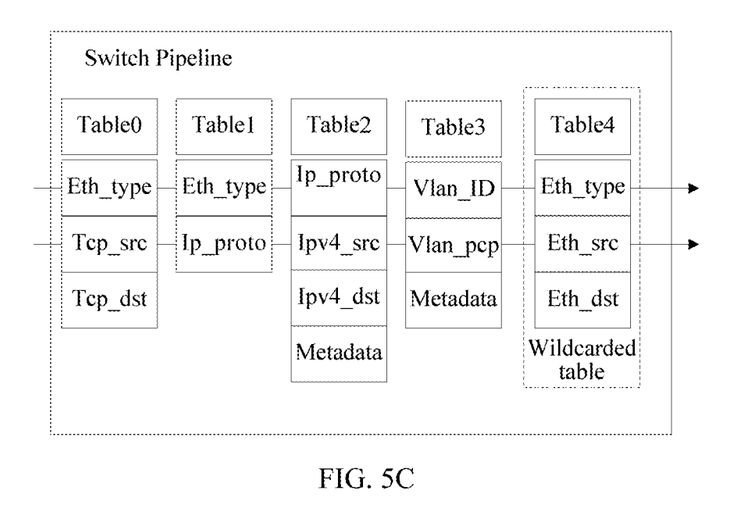
FIG. 5C is a structural diagram after positions of a precise matching table and a wildcarded table are interchanged according to the present disclosure.

After the OpenFlow1.2 protocol, the controller may instruct, by using a custom message, the switch to rearrange flow tables in the switch; therefore, the controller may instruct, by using the custom message, the switch to adjust the wildcarded table including a source host identifier matching domain to be the last flow table. The first switch may directly interchange positions of the last precise matching table and the wildcarded table, thereby adjusting the wildcarded table including a source host identifier matching domain to be the last flow table; or, the first switch may rearrange flow tables in the first switch, thereby adjusting the wildcarded table including a source host identifier matching domain to be the last flow table. For example, it is assumed that the source host identifier is a source host MAC address, and the source host identifier matching domain is implemented by using an Eth_src matching domain. Referring to FIG. 5B, assuming that the first switch includes five flow tables, and before flow table adjustment, Table2 of the Pipeline is a wildcarded table including an Eth_src matching domain and Table4 is a precise matching table not including the Eth_src matching domain, the controller may instruct the first switch to interchange flow tables Table2 and Table4. For a structure after the flow table adjustment, refer to FIG. 5C. Table2 is actually a precise matching table of the original Table4, and Table4 is a wildcarded table of the original Table2.

Step 501 and the replacement step of the foregoing step 501 may be performed when the first switch accesses the controller.

Step 502: The first switch receives a data packet sent by a source host, and when a flow entry of the data packet is not found in a local flow table, generates a Packet-in message, where the Packet-in message includes a source host identifier and a destination host identifier of the data packet.

The source host identifier may be a MAC address, an IP address, an input interface, or the like of the source host, which is not limited herein.

When the first switch finds the flow entry of the data packet in the local flow table, as shown in FIG. 1, the first switch forwards the data packet according to the flow entry. Details are not described herein.

Step 503: The controller receives the Packet-in message sent by the first switch; and when determining that a host indicated by the destination host identifier does not exist in an SDN network, the controller determines whether an abnormal flow entry of the source host indicated by the source host identifier has been delivered to the first switch, and if the abnormal flow entry of the source host indicated by the source host identifier has not been delivered to the first switch, sends an abnormal flow entry to the first switch, where the abnormal flow entry includes the source host identifier, and step 504 is performed; if the abnormal flow entry of the source host indicated by the source host identifier has been delivered to the first switch, a processing procedure of this branch ends.

For a processing method of the controller when the controller determines that the host indicated by the destination host identifier exists in the SDN network, refer to FIG. 2 and its corresponding description. Details are not described herein.

Implementation of the abnormal flow entry may be the same as a normal flow entry, and the so-called abnormal flow entry is merely used to distinguish from a normal flow entry sent by the controller, and used to represent that the flow entry is sent when the controller cannot find the destination host.

In the controller, an abnormal flow entry delivery flag may be set for each host, and whether the controller delivers an abnormal flow entry of a corresponding host is identified by using different flag values such as yes and no. In this step, the controller may determine, by using an abnormal flow entry deliver flag corresponding to the source host, whether an abnormal flow entry of the source host indicated by the source host identifier has been delivered to the first switch. Moreover, in this step, after sending the abnormal flow entry to the first switch, the controller needs to reset a flag value of the abnormal flow entry deliver flag corresponding to the source host, for example, reset the flag value from no to yes. In step 507, after receiving the triggering count, the controller needs to reset a flag value of the abnormal flow entry deliver flag corresponding to the source host, for example, reset the flag value from yes to no.

Step 504: The first switch receives the abnormal flow entry, and stores the abnormal flow entry in the last flow table.

Figure 5D:
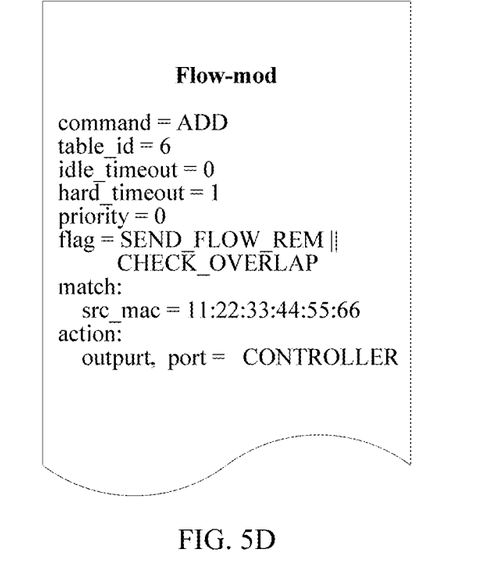
FIG. 5D is a schematic diagram of implementation of an abnormal flow entry according to the present disclosure.

In a possible implementation manner, the abnormal flow entry may include: an ETH_SRC matching domain, used to record a MAC address of a to-be-detected host, that is, a MAC address of the source host; an action, used to record an operation executed by a switch; idle_timeout, used to record an idle aging time of the abnormal flow entry; hard_timeout, used to record an aging time of the abnormal flow entry; a flag, used to record an attribute of the abnormal flow entry; and a priority, used to record a priority of the abnormal flow entry. For example, in implementation of an abnormal flow entry shown in FIG. 5D, a value of an ETH_SRC matching domain is 11:22:33:44:55:66, a value of an action is output to Controller, a value of idle_timeout is 0, a value of hard_timeout is 1, a value of a flag is SEND_FLOW_REM+CHECK_OVERLAP, and a value of a priority is a lowest priority 0.

Optionally, a priority of the abnormal flow entry delivered by the controller is preferably a lowest priority of a flow entry in the first switch.

Step 505: The first switch records, within an aging time of the abnormal flow entry, a triggering count of the abnormal flow entry.

In actual application, when the abnormal flow entry is triggered, preferably, the first switch continues to report a corresponding Packet-in message to the controller as in the prior art. In combination with the lowest priority of the abnormal flow entry and processing of storing the abnormal flow entry to the last flow table, this embodiment of the present disclosure further has the following advantages:

Assuming that an initial reason why a destination host B of a data packet sent by a source host A to the first switch cannot be found is due to that the destination host B is not powered on, or the like, the controller delivers an abnormal flow entry.

If the first switch reports a corresponding Packet-in message to the controller when the abnormal flow entry is triggered, if the destination host B is powered on within an aging time of the abnormal flow entry, after the destination host B is powered on, when receiving a Packet-in message that carries a source host A identifier and a destination host B identifier and that is sent by the first switch, the controller can find the destination host B, and deliver a normal flow entry about the source host A and the destination host B to the first switch.

In this case, because the abnormal flow entry has the lowest priority and is stored in the last flow table, when receiving a data packet from the source host A to the destination host B again, the first switch first matches the data packet with the normal flow entry, and forwards the data packet by using the normal flow entry, without triggering the abnormal flow entry.

Therefore, the foregoing processing of this embodiment of the present disclosure can prevent the first switch from continuing to trigger the abnormal flow entry and collect statistics about a triggering count in this case, further prevent the first switch from being incapable of normally forwarding a data packet from the source host A to the destination host B in this case, and prevent a controller from erroneously determining, according to a triggering count reported by the first switch, that the source host A is performing a malicious attack, thereby improving accuracy of a malicious attack detection result of the present disclosure.

Step 506: The first switch sends the triggering count to the controller after the abnormal flow entry times out.

In the prior art, after a flow entry times out, a switch may send a Flow-removed message to a controller to notify the controller that the flow entry expires. In this step, the first switch may also send the triggering count by using a Flow-removed message, and the triggering count may be carried in a packet-count field in the Flow-removed message.

Step 507: The controller receives the triggering count, and determines, according to the triggering count, whether a malicious attack is initiated from the source host indicated by the source host identifier.

In a possible implementation manner, that the controller determines, according to the triggering count, whether a malicious attack is initiated from the source host indicated by the source host identifier may include:

calculating, by the controller, a triggering rate of the abnormal flow entry according to the triggering count and an aging time of the abnormal flow entry; and determining, by the controller, whether the triggering rate is greater than a rate threshold; and if the triggering rate is greater than the rate threshold, determining, by the controller, that a malicious attack is initiated from the source host; or, if the triggering rate is not greater than the rate threshold, determining, by the controller, that no malicious attack is initiated from the source host.

In a second possible implementation manner, that the controller determines, according to the triggering count, whether a malicious attack is initiated from the source host indicated by the source host identifier may include:

determining, by the controller, whether the triggering count is greater than a count threshold; and if the triggering count is greater than the count threshold, determining, by the controller, that a malicious attack is initiated from the source host; or, if the triggering count is not greater than the count threshold, determining, by the controller, that no malicious attack is initiated from the source host.

The second possible implementation manner is generally used in a scenario in which aging times of abnormal flow entries delivered by the controller to different switches are fixed.

Specific values of the rate threshold and the count threshold may be set according to an actual application environment, which are not limited in the present disclosure.

Step 508: When determining that a malicious attack is initiated from the source host indicated by the source host identifier, the controller sends a third instruction to the first switch, where the third instruction is used to instruct the first switch to suppress a data packet from the source host.

The controller may suppress a data packet from the source host by delivering a special flow entry or an access control list (ACL) to the first switch.

In this embodiment, a controller does not need to collect statistics about Packet-in messages corresponding to each host, and instead, a first switch collects statistics about a triggering count of an abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

In addition, the abnormal flow entry has a lowest priority, and the first switch stores the abnormal flow entry in a last flow table, so that a malicious attack detection result in this embodiment of the present disclosure is more accurate.

The malicious attack detection methods shown in FIG. 3 to FIG. 5 may be used as an optional function of a switch and a controller, to perform malicious attack detection on a specified host at a specified moment. Specific detection timing may include but is not limited to the following cases:

1. Continuous detection is performed on a host connected to a switch, or, a user may set when to perform detection on which hosts.

2. No detection is performed on a host by default, and a rate at which a switch generates Packet-in messages caused by each port may be monitored. If the rate is greater than a preset upper limit threshold, malicious attack detection on all hosts connected to the port is enabled.

3. No detection is performed on a host by default. The OpenFlow1.3 protocol defines a Meter for monitoring a flow rate and further defines a Meter of an OFPM_CONTROLLER type for monitoring a rate at which a switch sends a Packet-in message. If the Packet-in rate is greater than an upper limit rate of the Meter, malicious attack detection on a host connected to the switch is triggered.

Corresponding to the foregoing methods, embodiments of the present disclosure further provide a malicious attack detection apparatus, a controller, and a switch.

Figure 6:
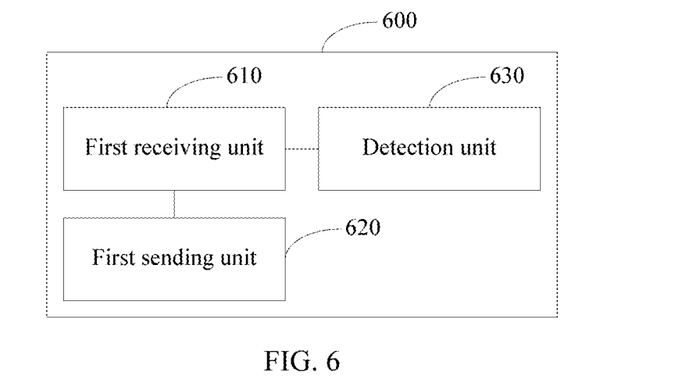
FIG. 6 is a schematic structural diagram of a first embodiment of a malicious attack detection apparatus according to the present disclosure.

Referring to FIG. 6, FIG. 6 is a schematic diagram of a first embodiment of a malicious attack detection apparatus 600 according to the present disclosure. The apparatus 600 may be disposed in a controller, and the apparatus 600 includes:

a first receiving unit 610, configured to receive a Packet-in message sent by a first switch, where the Packet-in message includes a source host identifier and a destination host identifier of a data packet for which the first switch does not find a flow entry;

a first sending unit 620, configured to: when it is determined that a host indicated by the destination host identifier received by the first receiving unit 610 does not exist in an SDN network, send an abnormal flow entry to the first switch, where the abnormal flow entry includes the source host identifier, where the first receiving unit 610 is further configured to receive a triggering count sent by the first switch, where the triggering count is sent by the first switch after the abnormal flow entry times out, and the triggering count is a quantity of times that the abnormal flow entry is triggered; and a detection unit 630, configured to determine, according to the triggering count received by the first receiving unit 610, whether a malicious attack is initiated from a source host indicated by the source host identifier.

In a first possible implementation manner, the detection unit 630 may be configured to:

calculate a triggering rate of the abnormal flow entry according to the triggering count received by the first receiving unit 610 and an aging time of the abnormal flow entry; and determine whether the triggering rate is greater than a rate threshold; and if the triggering rate is greater than the rate threshold, determine that a malicious attack is initiated from the source host; or, if the triggering rate is not greater than the rate threshold, determine that no malicious attack is initiated from the source host.

In a second possible implementation manner, the detection unit 630 may be configured to:

determine whether the triggering count is greater than a count threshold; and if the triggering count is greater than the count threshold, determine, that a malicious attack is initiated from the source host; or, if the triggering count is not greater than the count threshold, determine, that no malicious attack is initiated from the source host.

Optionally, the apparatus may further include:

a determining unit, configured to determine whether an abnormal flow entry of the source host indicated by the source host identifier has been delivered to the first switch; and if the abnormal flow entry of the source host indicated by the source host identifier has not been delivered to the first switch, trigger the first sending unit 620 to send an abnormal flow entry to the first switch.

In a first possible implementation manner, the first sending unit 620 may be further configured to: when it is determined that a last flow table in the first switch is a precise matching table including a source host identifier matching domain, instruct the first switch to configure the precise matching table as a precise matching table matching only the source host identifier matching domain, so that the first switch stores the abnormal flow entry in the last flow table.

In a second possible implementation manner, the first sending unit 620 may be further configured to: when it is determined that a last flow table in the first switch is a precise matching table, and a wildcarded table including a source host identifier matching domain exists in the first switch, send a second instruction to the first switch, where the second instruction is used to instruct the first switch to adjust the wildcarded table including a source host identifier matching domain to be the last flow table, so that the first switch stores the abnormal flow entry in the last flow table.

Optionally, the first sending unit 620 may be further configured to:

when it is determined, according to the triggering count, that a malicious attack is initiated from the source host indicated by the source host identifier, send a third instruction to the first switch, where the third instruction is used to instruct the first switch to suppress a data packet from the source host.

In this embodiment, a controller does not need to collect statistics about Packet-in messages corresponding to each host, and sends an abnormal flow entry to a first switch instead; the first switch collects statistics about a triggering count of the abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

Figure 7:
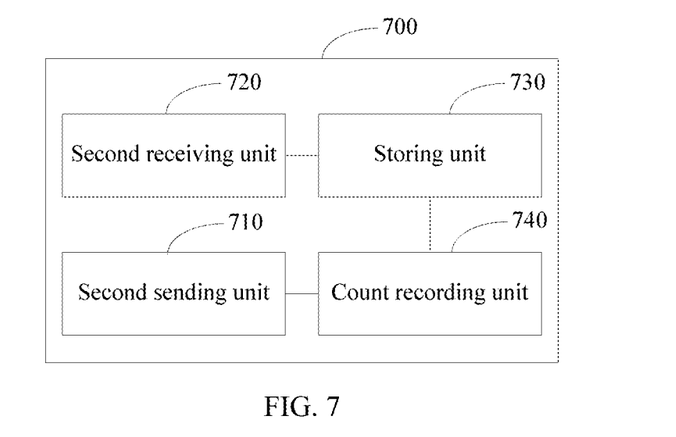
FIG. 7 is a schematic structural diagram of a second embodiment of a malicious attack detection apparatus according to the present disclosure.

Referring to FIG. 7, FIG. 7 is a schematic diagram of a second embodiment of a malicious attack detection apparatus 700 according to the present disclosure. The apparatus 700 may be disposed in a first switch, and the apparatus 700 includes:

a second sending unit 710, configured to: when it is determined that a flow entry corresponding to a data packet is not found, send a Packet-in message to a controller, where the Packet-in message includes a source host identifier and a destination host identifier of the data packet;

a second receiving unit 720, configured to receive an abnormal flow entry sent by the controller, where the abnormal flow entry is sent by the controller when determining that a host indicated by the destination host identifier does not exist in an SDN network;

a storing unit 730, configured to save the abnormal flow entry received by the second receiving unit 720; and a count recording unit 740, configured to record, within an aging time of the abnormal flow entry saved by the storing unit 730, a triggering count of the abnormal flow entry, where the second sending unit 710 is further configured to: after the abnormal flow entry saved by the storing unit times out, send the triggering count to the controller, so that the controller determines, according to the triggering count, whether a malicious attack is initiated from a source host indicated by the source host identifier.

Optionally, the second receiving unit 720 may be further configured to receive a first instruction sent by the controller; and the apparatus further includes: a configuration unit, configured to configure, according to the first instruction, a local precise matching table which is a last flow table as a precise matching table matching only a source host identifier matching domain; or the second receiving unit 720 may be further configured to receive a second instruction sent by the controller; and the apparatus further includes: a configuration unit, configured to adjust a wildcarded table including a source host identifier matching domain to be a last flow table according to the second instruction.

Optionally, the storing unit 730 may be configured to save the abnormal flow entry to the last flow table.

Optionally, the second receiving unit 720 may be further configured to receive a third instruction sent by the first switch; and the apparatus may further include: a control unit, configured to suppress a data packet from the source host.

In this embodiment, a controller does not need to collect statistics about Packet-in messages corresponding to each host, and instead, a first switch collects statistics about a triggering count of an abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

Figure 8:
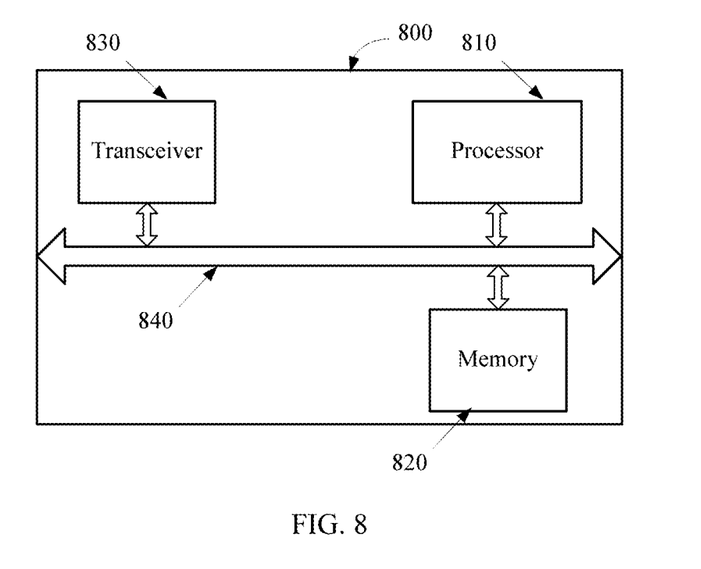
FIG. 8 is a schematic structural diagram of a controller according to the present disclosure.

Referring to FIG. 8, FIG. 8 is a schematic structural diagram of a controller 800 according to an embodiment of the present disclosure. The controller 800 includes: a processor 810, a memory 820, a transceiver 830, and a bus 840.

The processor 810, the memory 820, and the transceiver 830 are interconnected by using the bus 840. The bus 840 may be an ISA bus, a PCI bus, or an EISA bus. The bus may be an address bus, a data bus, or a control bus. For ease of illustration, the bus is represented by using a bold line in FIG. 8, but it does not mean that there is only one bus or one type of bus.

The memory 820 is configured to store a program. The program may include program code, and the program code includes a computer operation instruction. The memory 820 may include a high speed RAM memory, and may further include a non-volatile memory, for example, at least one magnetic disk memory.

The transceiver 830 is configured to connect another device, and communicate with the another device. The transceiver 830 is configured to receive a Packet-in message sent by a first switch, where the Packet-in message includes a source host identifier and a destination host identifier of a data packet for which the first switch does not find a flow entry; send an abnormal flow entry to the first switch, where the abnormal flow entry includes the source host identifier; and receive a triggering count sent by the first switch, where the triggering count is sent by the first switch after the abnormal flow entry times out, and the triggering count is a quantity of times that the abnormal flow entry is triggered.

The processor 810 executes the program code, and is configured to determine whether a host indicated by the destination host identifier exists in an SDN network, and when it is determined that the host indicated by the destination host identifier does not exist in the SDN network, control the transceiver 830 to send an abnormal flow entry to the first switch; and is further configured to determine, according to the triggering count received by the transceiver 830, whether a malicious attack is initiated from a source host indicated by the source host identifier.

Optionally, the processor 810 may be configured to calculate a triggering rate of the abnormal flow entry according to the triggering count and an aging time of the abnormal flow entry; and determine whether the triggering rate is greater than a rate threshold; and if the triggering rate is greater than the rate threshold, determine that a malicious attack is initiated from the source host; or, if the triggering rate is not greater than the rate threshold, determine that no malicious attack is initiated from the source host.

Optionally, the processor 810 may be configured to determine whether the triggering count is greater than a count threshold; and if the triggering count is greater than the count threshold, determine, that a malicious attack is initiated from the source host; or, if the triggering count is not greater than the count threshold, determine, that no malicious attack is initiated from the source host.

Optionally, the processor 810 may be further configured to: before the transceiver 830 sends an abnormal flow entry to the first switch, determine whether an abnormal flow entry of the source host indicated the source host identifier has been delivered to the first switch; if the abnormal flow entry of the source host indicated by the source host identifier has not been delivered to the first switch, perform the step of controlling the transceiver 830 to send an abnormal flow entry to the first switch.

Optionally, the processor 810 may be further configured to: when it is determined that a last flow table in the first switch is a precise matching table including a source host identifier matching domain, control the transceiver 830 to send a first instruction to the first switch, where the first instruction is used to instruct the first switch to configure the precise matching table as a precise matching table matching only the source host identifier matching domain, so that the first switch stores the abnormal flow entry in the last flow table.

The transceiver 830 may be further configured to send a first instruction to the first switch.

Optionally, the processor 810 may be further configured to: when it is determined that a last flow table in the first switch is a precise matching table, and a wildcarded table including a source host identifier matching domain exists in the first switch, control the transceiver 830 to send a second instruction to the first switch, where the second instruction is used to instruct the first switch to adjust the wildcarded table including a source host identifier matching domain to be the last flow table, so that the first switch stores the abnormal flow entry in the last flow table.

The transceiver 830 may be further configured to send a second instruction to the first switch.

Optionally, the processor 810 may be further configured to: when it is determined, according to the triggering count, that a malicious attack is initiated from the source host indicated by the source host identifier, control the transceiver 830 to send a third instruction to the first switch, where the third instruction is used to instruct the first switch suppress a data packet from the source host.

The transceiver 830 may be further configured to send a third instruction to the first switch.

In this embodiment, a controller does not need to collect statistics about Packet-in messages corresponding to each host, and sends an abnormal flow entry to a first switch instead; the first switch collects statistics about a triggering count of the abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

Figure 9:
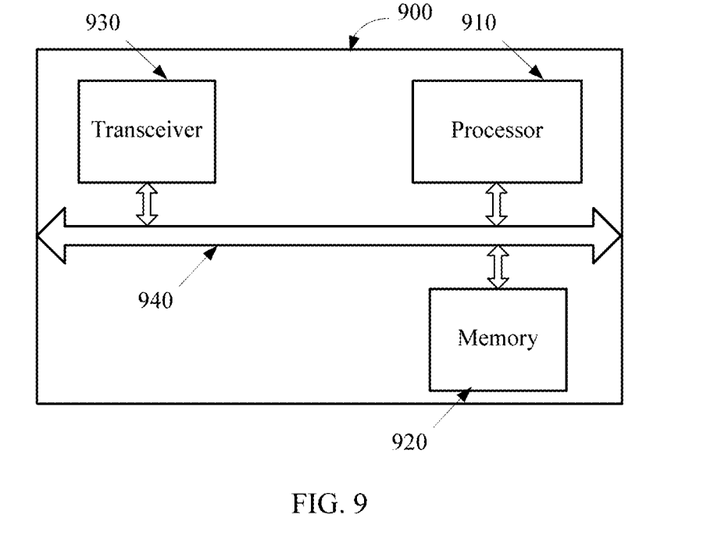
FIG. 9 is a schematic structural diagram of a switch according to the present disclosure.

Referring to FIG. 9, FIG. 9 is a schematic structural diagram of a first switch 900 according to an embodiment of the present disclosure. The first switch 900 includes: a processor 910, a memory 920, a transceiver 930, and a bus 940.

The processor 910, the memory 920, and the transceiver 930 are interconnected by using the bus 940. The bus 940 may be an ISA bus, a PCI bus, or an EISA bus. The bus may be an address bus, a data bus, or a control bus. For ease of illustration, the bus is represented by using a bold line in FIG. 9, but it does not mean that there is only one bus or one type of bus.

The memory 920 is configured to store a program. The program may include program code, and the program code includes a computer operation instruction. The memory 920 may include a high speed RAM memory, and may further include a non-volatile memory, for example, at least one magnetic disk memory. Moreover, the memory 920 is further configured to store a flow table.

The transceiver 930 is configured to connect another device, and communicate with the another device. The transceiver 930 is configured to send a Packet-in message to a controller, where the Packet-in message includes a source host identifier and a destination host identifier of a data packet; receive an abnormal flow entry sent by the controller when determining that a host indicated by the destination host identifier does not exist in an SDN network; and send a triggering count of the abnormal flow entry to the controller, so that the controller determines, according to the triggering count, whether a malicious attack is initiated from a source host indicated by the source host identifier.

The processor 910 executes the program code, and is configured to: when it is determined that a flow entry corresponding to the data packet is not found, control the transceiver 930 to send a Packet-in message to the controller; save the abnormal flow entry received by the transceiver 930 to the memory 920, where the abnormal flow entry is sent by the controller when determining that the host indicated by the destination host identifier does not exist in an SDN network; and record, in an aging time of the abnormal flow entry, a triggering count of the abnormal flow entry, and control the transceiver 930 to send the triggering count to the controller after the abnormal flow entry times out.

Optionally, the transceiver 930 may be further configured to receive a first instruction sent by the controller; and the processor 910 may be further configured to configure a local precise matching table which is a last flow table as a precise matching table matching only a source host identifier matching domain according to the first instruction received by the transceiver 930; or the transceiver 930 may be further configured to receive a second instruction sent by the controller; and the processor 910 may be further configured to adjust a wildcarded table including a source host identifier matching domain to be a last flow table according to the second instruction received by the transceiver 930.

Optionally, the processor 910 may be configured to save the abnormal flow entry to the last flow table in the memory 920.

Optionally, the transceiver 930 may be further configured to receive a third instruction sent by the controller, where the third instruction is sent by the controller when determining, according to the triggering count, a malicious attack is initiated from the source host indicated by the source host identifier.

The processor 910 may be further configured to suppress, according to the third instruction received by the transceiver 930, a data packet from the source host.

In this embodiment, a controller does not need to collect statistics about Packet-in messages corresponding to each host, and instead, a first switch collects statistics about a triggering count of an abnormal flow entry and reports the triggering count to the controller; the controller directly determines, according to the triggering count, whether a malicious attack is initiated from a source host indicated by a source host identifier. In this way, message statistics collection originally performed by the controller is distributed to each switch for execution, thereby reducing a data processing volume of the controller, and improving performance of the controller.

A person skilled in the art may clearly understand that, the technologies in the embodiments of the present disclosure may be implemented by software in addition to a necessary general hardware platform. Based on such an understanding, the technical solutions of the present disclosure essentially or the part contributing to the prior art may be implemented in a form of a software product. The software product is stored in a storage medium, such as a read-only memory (ROM)/random access memory (RAM), a hard disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, refer to these embodiments, and each embodiment focuses on a difference from other embodiments. Especially, a system embodiment is basically similar to a method embodiment, and therefore is described briefly; for related parts, refer to partial descriptions in the method embodiment.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A malicious attack detection method performed by a controller of a software-defined network (SDN), comprising:
   receiving a Packet-in message sent by a switch of the SDN, wherein the Packet-in message indicates there is no matching flow entry for a data packet in the switch and comprises a source host identifier and a destination host identifier of the data packet;
   determining that a destination host indicated by the destination host identifier does not exist in the SDN;
   sending an abnormal flow entry to the switch in response to determining that the destination host indicated by the destination host identifier does not exist in the SDN, wherein the abnormal flow entry comprises the source host identifier of the data packet;
   receiving a triggering count from the switch after the abnormal flow entry times out, wherein the triggering count indicates a number of times that the abnormal flow entry is triggered due to the switch receiving other data packets that contain the source host identifier; and
   determining according to the triggering count, whether a malicious attack is initiated from a source host indicated by the source host identifier.

2. The method according to claim 1, wherein the step of determining whether a malicious attack is initiated comprises:
   determining whether the triggering count is greater than a count threshold;
   wherein a malicious attack is initiated from the source host when the triggering count is greater than the count threshold.

3. The method according to claim 1, further comprising:
   determining that a last flow table in the switch is a precise matching table comprising a source host identifier matching domain;
   sending an instruction to the switch to instruct the switch to configure the precise matching table for matching only the source host identifier matching domain.

4. The method according to claim 1, further comprising:
   determining that a last flow table in the switch is a precise matching table, and a wildcarded table comprising a source host identifier matching domain exists in the switch;
   sending an instruction to the switch to instruct the switch to adjust the wildcarded table to be the last flow table.

5. The method according to claim 1, further comprising:
   determining, according to the triggering count, that a malicious attack is initiated from the source host indicated by the source host identifier;
   sending an instruction to the switch to instruct the switch to suppress a data packet from the source host.

6. A controller apparatus of a software-defined network (SDN), comprising:
   a processor;
   a memory, configured to store instructions;
   a transceiver; and
   a bus,
   wherein the processor, the memory, and the transceiver are interconnected using the bus, and wherein the processor is configured to:
      receive a Packet-in message sent by a switch of the SDN, wherein the Packet-in message indicates there is no matching flow entry in the switch for a data packet received by the switch, and comprises a source host identifier and a destination host identifier of the data packet,
      determine that a destination host indicated by the destination host identifier does not exist in the SDN,
      in response to determining that the destination host indicated by the destination host identifier does not exist in the SDN, send an abnormal flow entry to the switch, wherein the abnormal flow entry includes the source host identifier;
      receive a triggering count from the switch after the abnormal flow entry times out, wherein the triggering count indicates a number of times that the abnormal flow entry is triggered due to the switch receiving other data packets containing the source host identifier; and
      determine, according to the triggering count received by the transceiver, whether a malicious attack is initiated from a source host indicated by the source host identifier.

7. The controller apparatus according to claim 6, wherein the processor is further configured to:
   calculate a triggering rate of the abnormal flow entry according to the triggering count and an aging time of the abnormal flow entry; and
   determine whether the triggering rate is greater than a rate threshold; and
   determine that a malicious attack is initiated from the source host when the triggering rate is greater than the rate threshold.

8. The controller apparatus according to claim 6, wherein the processor is further configured to:
   determine whether the triggering count is greater than a count threshold; and
   determine that a malicious attack is initiated from the source host when the triggering count is greater than the count threshold.

9. The controller apparatus according to claim 6, wherein the processor is further configured to execute the instructions to:
   determine that a last flow table in the switch is a precise matching table comprising a source host identifier matching domain;
   send an instruction to the switch to instruct the switch to configure the precise matching table for matching only the source host identifier matching domain.

10. The controller apparatus according to claim 6, wherein the processor is further configured to execute the instructions to:
    determine that a last flow table in the switch is a precise matching table, and a wildcarded table comprising a source host identifier matching domain exists in the switch;
    send an instruction to the switch to instruct the switch to adjust the wildcarded table to be the last flow table switch.

11. The controller apparatus according to claim 6, wherein the processor is further configured to execute the instructions to:
    determine, according to the triggering count, that a malicious attack is initiated from the source host indicated by the source host identifier;
    control the transceiver to send an instruction to the switch to instruct the switch to suppress a data packet from the source host.

* * * * *